United States Patent Office 3,458,695
Patented July 29, 1969

3,458,695
ELECTRICAL CALCULATING DEVICE FOR DETERMINING THE DERIVATIVES AND STANDARD DEVIATION OF A FUNCTION
David A. G. Tait, Farnborough, England, assignor to The Solartron Electronic Group Limited, Farnborough, Hampshire, England, a corporation of the United Kingdom
Filed Sept. 3, 1965, Ser. No. 484,998
Claims priority, application Great Britain, Sept. 4, 1964, 36,364/64
Int. Cl. G06g 7/18
U.S. Cl. 235—193
11 Claims

ABSTRACT OF THE DISCLOSURE

A device for calculating the mean slope of a function or the mean value of a higher order derivative within an interval definable by a series of point values. A series of analog currents are cyclicably commutated to a mean value measuring instrument whose response time is at least of an order of magnitude of the commutation cycle. Also, coincidentally commutated to the measuring instrument is a second series of currents having adjustable magnitudes but which increase for a negative mean derivative of the function (and decrease for a positive mean derivative) in such a way that their $n^{th}$ difference is constant. The measuring instrument is also fed a constant current of magnitude sufficient to nullify the mean value of the second series of currents.

Figure 1:
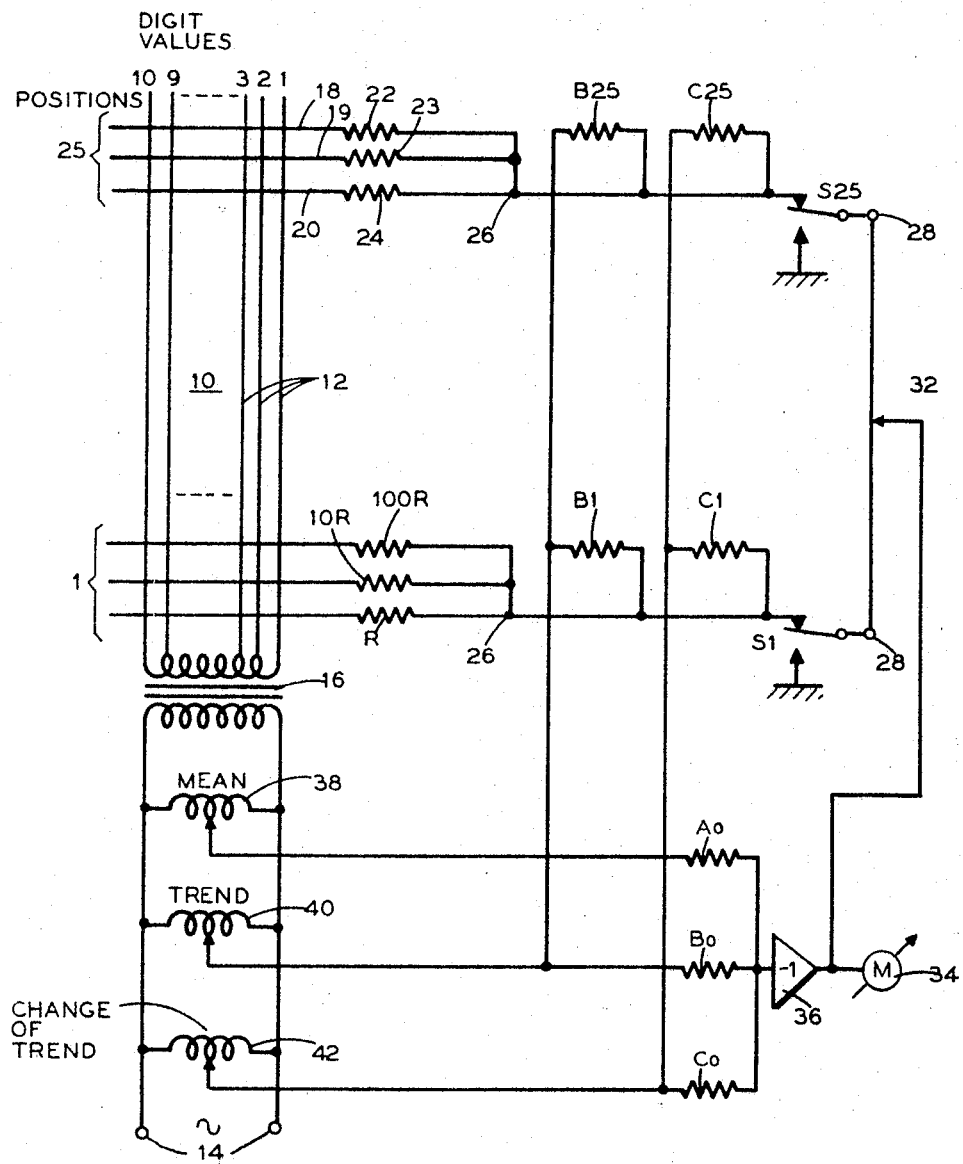

The present invention relates to an electrical calculating device of the type in which a function can be represented by a series of analogue currents.

An object of the invention is to provide means for calculating the means value of the function and derivatives of the function.

A further object of the invention is to provide means for calculating the standard or other deviation of the or each calculated quantity.

According to the present invention in one aspect there is provided means for communicating the analogue currents cyclically to a mean value measuring instrument whose response time is at least of the order of magnitude of the period of the commutation cycle and means for feeding a constant opposing current of adjustable value to the measuring instrument.

When the analogue currents are direct currents the measuring instrument may indicate true mean value but when the analogue currents are alternating currents the mean value measuring instrument must be a phase-sensitive instrument, i.e. one which indicates the mean value of each half cycle, and the phase of the signal measured with respect to a reference signal. For example a meter incorporating a synchronous rectifier circuit could be used.

If the constant current is adjusted to minimise the instrument reading, the magnitude of the current equals the magnitude of the mean value of the commutated currents.

If the measuring instrument can be switched to read mean modulus, that is mean magnitude taking no account of sign, the mean deviation of the function can be read from the meter when the constant current has been adjusted for minimum meter reading.

In supplying the constant current the mean value of the function is reduced to zero and values of the function become positive and negative, each value representing a deviation from the mean. The mean deviation is proportional to the sum of these deviations which is read from the instrument.

If the instrument can also be switched to read root means square values, that is it is responsive to the energy of its input current for example a thermocouple or hot-wire meter, then standard deviations can also be measured once the current adjustment has been carried out. In this case the sum of the squares of the deviations is measured and its square root is taken by the scale of the instrument, the meter reading then being proportional to the standard deviation. Thus the instrument may be of the readily available kind which can be switched between making mean, mean modulus and root mean square readings.

A very similar device to that already considered will calculate the mean slope of the function or the mean value of a higher derivative within the interval defined by the series of point values. Thus according to the invention in another aspect there is provided means for commutating the analogue currents cyclically to a mean value measuring instrument whose response time is at least of the order of magnitude of the period of the commutation cycle, means for simultaneously commutating to the instrument a second series of currents which are adjustable in magnitude but always increase for a negative mean derivative of the function or decrease for a positive mean derivative from one to the other in such a way that their $n^{th}$ difference (but not their $(n-1)^{th}$ difference) is constant where the mean value to be calculated is that of the $n^{th}$ derivative and means for feeding a consant current to the measuring instrument whose magnitude varies as the second series currents vary so as to cancel out the effect of the mean value of the second series currents. In the case of derivatives higher than the first it is also necessary to choose the second series of currents so that the mean values of the $(n-1)^{th}$ differences down to the first differences are zero.

The magnitude of the second series of currents is adjusted for minimum root mean square reading on the instrument, the sign of the derivative of the function represented by the analogue currents having been arranged to be opposite to the sign of the derivative of a function represented by the second series of currents, and the two derivatives tending to cancel one another to generally level out the amplitudes of the currents reaching the instrument and thus reduce the root mean square reading. The mean and mean modulus value readings will not be altered since currents of mean value zero have been added. The mean of the derivative is equal to the constant current supplied to cancel out the effect of the mean value of the second series of currents.

The deviations of a derivative can be read on the meter if the mean of the analogue currents and the mean of all the lower derivatives have previously been supplied to the instrument in the way described above. It is necessary that the mean values of the $(n-1)^{th}$ differences down to the first differences are zero for derivatives higher than the first, so that the $n^{th}$ derivative only is cancelled by the series of currents corresponding to that derivative.

The effect of the balancing currents set up for calculating each mean value are independent of each other and therefore a combined device for calculating several mean values may be constructed with the property that the adjustment for determining each mean value is independent of the other adjustments.

Figure 2:
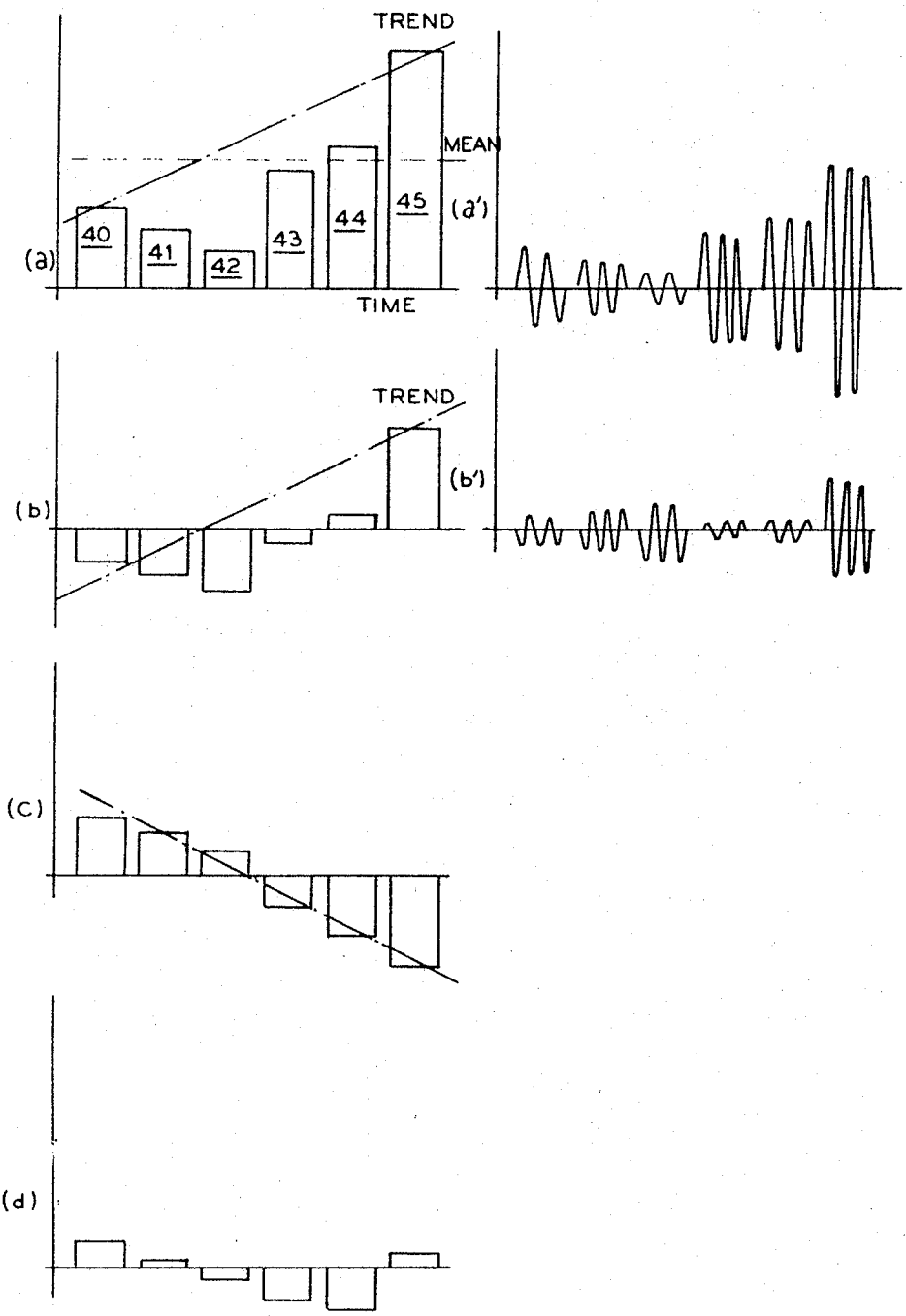
Figure 3:
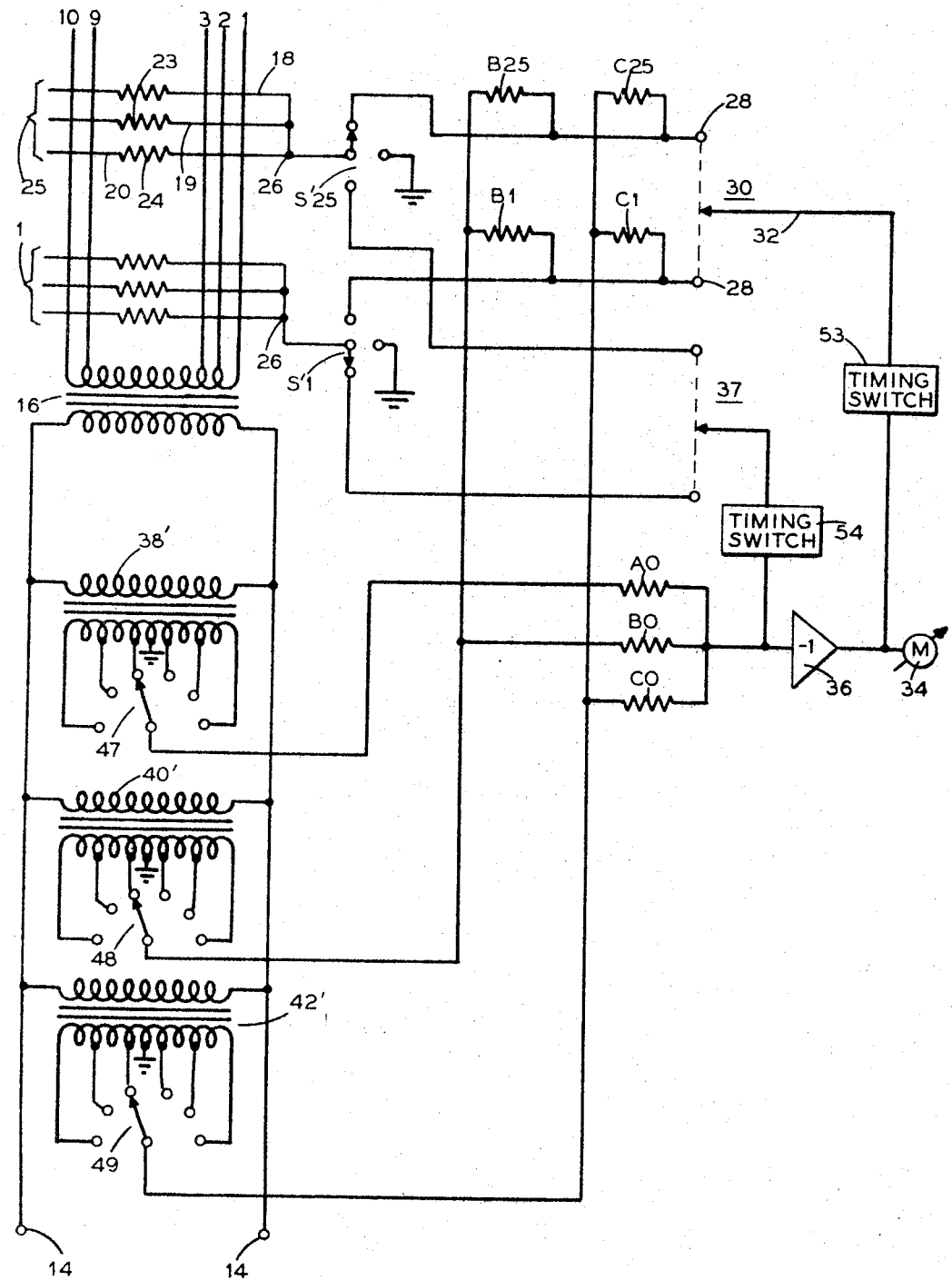

An embodiment of the invention for calculating the mean values of a function and of its first and second derivatives will now be described by way of example with reference to the accompanying drawings, in which:

FIG. 1 shows one embodiment of the invention,

FIG. 2 illustrates various currents in A.C. or D.C. embodiments of the invention, and FIG. 3 shows a second embodiment of the invention.
The principles of the invention will first be described with reference to FIG. 2. Five point values of a function are represented by the magnitude of positive analogue currents 40 to 45. The mean of these currents can be read on a mean value measuring instrument whose response time is as long as the total duration of the five currents. If a current is added to the currents of FIG. 2(a) and is adjusted until the mean is minimized, the mean of the current added opposes but is equal to the mean of the currents 40 to 45, and the currents shown in FIG. 2(b) are obtained. It can be seen that a mean modulus meter will measure the standard deviation of the function if the currents of FIG. 2(b) are fed to it. Similarly a root mean square meter will measure the mean deviation of the function.

For measuring the mean of the first derivative that is the trend of the function a second series of currents is added to the currents of FIG. 2(b) and is adjusted until the mean modulus or root mean square of the sum is a minimum when the trend of the second series of currents is equal to but of opposite sign to the mean trend of the function. Such a series of currents is shown in FIG. 2(c), and the results of this addition is shown in FIG. 2(d). A mean modulus or a root mean square meter will measure mean or standard deviation of the trend when measuring the currents of FIG. 2(d). The second series of currents can also be added to the currents of FIG. 2(a) if the mean of the trend only is required. In this case the meter is switched to root mean square and the second series of currents is adjusted until a minimum is obtained. The mean of the second series of currents then equals the mean of the trend.

When alternating analogue currents are used the function is represented by currents having the waveform of FIG. 2(a'). The mean of these currents can be measured on a phase-sensitive meter, and when a current equal to but out of phase with the mean current is added to the currents of FIG. 2(a') the currents shown in FIG. 2(b') are obtained. Where the corresponding direct currents would have been negative, a phase reversal occurs which is taken account of by the phase-sensitive meter, so that as with D.C. the meter reading can be minimised before measuring mean and standard deviations.

In the same way alternating currents on which phase is analogous to the sign of direct currents can be shown to behave in the way illustrated in FIGS. 2(c) and (d).

In the illustrated device up to twenty five point values may be set up manually on a patchboard 10 to an accuracy of three decimal digits, i.e. 0.1% of the full scale value. The patchboard has ten conductors 12 energized from A.C. supply terminals 14 through a transformer 16 which is so taped on its secondary side that the E.M.F.'s in the conductors 12 are in the ratios of the digit values 1 to 10 assigned to these conductors. At each of twenty five positions (one for each function point value) the conductors 12 are traversed by three conductors 18, 19 and 20 corresponding respectively to tenths, units and tens in the point value to be set up. Each of these three conductors may be connected at the appropriate patchboard crossings to the conductors 12 giving the required digit values. The conductors 18, 19 and 20 are connected through weighting resistors 22, 23 and 24 with respective values 100R, 10R and R to a summing junction 26. It follows that the current flowing into each summing junction 26 is an analogue representation of the value set up at the corresponding patchboard position.

The means described for obtaining the twenty five analogue currents are in no way an essential part of the invention. Other manually operated means may be used, e.g. a matrix of switches, digital-to-analogue converter means may be arranged to operate automatically upon a computer output or in some instances where the function in question is a physical variable measured by suitable transducers, the analogue currents may be available ab initio.

The twenty five summing junctions 26 are connected through switches S1 to S25 to the fixed contacts 28 of a twenty-five position commutator 30. The switches S1 to S25 are provided for disconnecting redundant junctions 26 from the commutator and earthing the corresponding contacts 28 when less than twenty-five point values are to be handled. The wiper 32 of the commutator is connected to a meter 34 of known type, in this case, where alternating analogue currents are used, the meter incorporates a synchronous rectifier circuit between its input and the rest of the meter, which may be switched out for mean modulus and root mean square measurements. The meter has a virtual earth input.

An opposing, adjustable, constant current is also fed to the meter 34 through a resistor $A_O$ and an inverting amplifier 36. The current is obtained from the slider of a multi-turn inductive potentiometer 38 (an I-pot) and when it is adjusted to minimise the reading of the meter 34, the meter being switched to measure the mean current of half current cycles and rectifying the sum current at the meter, the current through the resistor $A_O$ equals the mean of the commutated currents and the meter reading equals the mean deviation of the currents. This assumes that all the switches S1 to S25 are closed and that each current flows for the full duration of the commutation interval assigned to it, i.e. has a duty cycle of 1 in its commutation sub-period of duration $P/25$ where P is the period of the full commutation cycle. If the duty cycle is less than 1 the current through $A_O$ must be corrected in inverse proportion but in any event the potentiometer 38 may be correctly calibrated. Of course if any of the switches S1 to S25 is open a proportionate correction must always be applied.

The response time of the meter must be at least of the same order of magnitude as the commutation period P in order that the meter 34 may show a steady reading. In addition certain other precautions need to be taken when the currents used are alternating currents, as is the case in the embodiment being described and as is preferred. The commutator sub-period can equal the supply frequency period or a multiple thereof, or can be vary much smaller than the supply frequency period, provided the two are locked in phase. In this case it is possible to include a precision timing switch, similar to timing switches 53 and 54 in FIG. 3, between the wiper 32 and the meter 34 in order to define the duration of each commutated current precisely (the appropriate correction in accordance with the selected duty cycle being made as already explained). If however the commutator frequency is not synchronized with the supply frequency care must be taken that the meter response time is long compared with the periods of any beats formed between the supply frequency or multiples or sub-multiples thereof and the commutator frequency. Alternatively the supply may be a random noise signal rather than a simple A.C. signal so long as the meter has a pass band small compared with the noise band and responds only to low frequencies, thus giving a steady reading.

For measuring the mean value of the first derivative of the function a second I-pot 40 has its wiper connected through a series of resistors B1 to B25 to the summing junctions 26. The values of these resistors are in arithmetical progression, i.e. their first differences are constant. Currents which are likewise in arithmetical progression are therefore also commutated to the meter 34 when the potentiometer 40 is in other than its zero setting. The mean of these currents is cancelled out by constant current from the wiper of the potentiometer 40 passing through a resistor $B_O$ of appropriate value and the amplifier 36 to the meter 34. If the mean slope of the function is arranged to be opposite to the slope of a function represented by the currents in arithmetical progression, the potentiometer 40 can be adjusted to minimise the meter root mean square reading, the mean value of the slope or trend (first derivative) of the function is determined, from the current in the resistor $B_O$ irrespective of the setting of the potentiometer 38.

In a similar fashion a third I-pot 42 has its wiper connected through resistors C1 to C25 to the summing junctions 26 and through a resistor $C_O$ to the inverting amplifier 36. The values of the resistors C1 to C25 are such that their first differences are in arithmetical progression, their second differences thus being constant. The mean of the first differences is made zero and the mean of the currents is cancelled by the current through $C_O$. This may be achieved by making the current $Im$ to the $m$th summing junction ($m$ running from 0 to $p$ and $p$ thus being 24 in the embodiment illustrated), equal to $k\ (m-\frac{1}{2}p)^2$ where $k$ is constant. By adjusting the potentiometer 42 to minimise the meter root means square reading, irrespective of the settings of the other potentiometers, the mean value of the second derivative, which may be referred to as the change of trend is ascertained by measuring the current in the resistor $C_O$, provided that the sign of the second derivative is arranged to be opposite to that of the function representated by the currents in resistors $C_O$ to C25.

The supply to the terminals 14 is balanced to earth so that the sign of the first and second derivatives of the currents through the resistors $B_O$ to B25 and $C_O$ to C25 can be varied from positive at one end of the I-pot to negative at the other end.

Whilst the mean values may be determined independently from the settings of the potentiometers, this is not true of the deviations which are measured with the meter 34 switched to read mean modulus current or root mean square current. The required procedure is first to set both potentiometers 40 and 42 to zero, to adjust potentiometer 38 from a minimum mean current and then to switch the meter 34 to mean modulus or root mean square measurement as required. This give mean and standard deviation of the mean. Then, leaving the potentiometer 38 untouched, adjust the potentiometer 40 for minimum whereupon the residual reading gives the deviation of the mean trend. If the potentiometer 42 is now adjusted for minimum deviation, the residual deviation is the deviation from the change of trend.

Another embodiment of the invention is shown in FIG. 3 where components having the same function as in FIG. 1 have been given the same designations. Using the arrangement of FIG. 3 negative values of functions can be set up. The switches S1 to S25 have been replaced by three position switches S'1 to S'25 the extra contact of which is connected to a second commutator 37 and the common contact of which is taken to the input of the amplifier 36. If any of the switches S'1 to S25 are moved to connect a point 26 to the commutator 37, the point value of the function represented by the resulting current will be negative.

The I-pots 38, 40 and 42 are replaced by phase-splitting transformers 38', 40' and 42' whose secondaries are connected through multi-position switches 47, 48 and 49 respectively to the resistors $A_O$, $B_O$ and $C_O$. The change over switches are provided to allow positive or negative values of mean, trend, or change of trend to be represented by in or out-of-phase currents.

Each of the commutators 30 and 37 is a ring of sealed reed relays energised sequentially by a magnet rotating on the end of an arm driven by a synchronous motor (not shown). The effective time spent on each contact is controlled by additional switches 53 and 54 in series with the common outputs of the commutators. These switches are operated at main frequency with a 1:1 mark/space ratio. The gearing of the synchronous motors is chosen so that the number of reeds operated per second is equal to the mains frequency. This allows the operation of the reeds to be uncertain to the extent of a 3:1 variability without affecting the performance of the calculator.

The frequency applied to the terminals 14 can conveniently be 5 kc./s.

The various adjustments of the potentiometers may be made to follow a programmed sequence automatically, using servo controls responsive to the reading of the meter 34 to adjust each potentiometer for a minimum reading as required.

Instead of I-pots or transformers, ordinary resistive potentiometers may be used, provided suitable precautions are taken with regard to allocation of loading or buffering. Furthermore the whole device may as has been mentioned operate on direct current.

While only two embodiments of the present invention are disclosed and described herein, it will be readily apparent to persons skilled in the art that numerous changes and modifications may be made without departing from the scope of the invention. Accordingly, the foregoing disclosure and description thereof are for illustrative purposes only and do not in any way limit the invention which is defined only by the claims which follow.

I claim:

1. An electrical calculating device including, means for providing a series of analog currents representing point values of a function, a mean value measuring instrument, commutator means for commutating said currents to said instrument, the response time of said instrument being at least of the order of magnitude of the cycle of operation of said commutator means, means for feeding a constant current of adjustable value, opposing said analog currents to said instrument, means for providing a second series of currents, whereby the mean value of a derivative of the function can be calculated, the said second series of currents being adjustable in magnitude and differing from one to the next in the same sense in such a way that their $n^{th}$ difference is constant where the mean value to be calculated is that of the $n^{th}$ derivative, the mean value of the $(n-1)^{th}$ differences down to the first difference being zero when said derivative is not the first derivative, said second series of currents being commutated by said commutator means to said instrument, and means for feeding a constant current to said instrument, of magnitude equal to the mean current of said second series, in opposition to said current of said second series.

2. An electrical calculating device including an A.C. source, a transformer having a primary winding and a multitap secondary winding, said primary winding being connected to said source, a plurality of groups of resistors, the values of the resistors in said groups being in a geometrical progression, a number of summing junctions equal to the number of said groups of resistors, and one end of each of said resistors in each of said groups being connected to one of said junctions, means for connecting the end of any of said resistors remote from said junctions to any tap of said secondary winding, whereby analog currents representing a function can be set up at said summing junctions, commutator means having segments connected to said junction and wiper means, measuring means, adapted to measure selectively mean, mean modulus and root mean square values, connected to said wiper means, potentiometer means, having adjustable tapping means, connected across said primary winding, inverter means connected between said adjustable tapping means and said measuring means, means for providing a second series of currents whereby a derivative of said function can be calculated comprising, a further potentiometer, having adjustable tapping means, connected across said primary winding, a series of resistors each of which connects one of said junctions to said tapping means of said further potentiometer, the values of the resistors in each series having their $n^{th}$ differences constant, and a mean resistor, having a value equal to the mean value of said resistors in said series, connected between the tapping means of said further potentiometer and said inverter.

3. An electrical calculating device including an A.C. source, a transformer having a primary winding and a multitap secondary winding, said primary winding being connected to said source, a plurality of groups of resistors, the values of the resistors in said groups being in a geometrical progression, a number of summing junctions equal to the number of said groups of resistors, and one end of each of said resistors in each of said groups being connected to one of said junctions, means for connecting the end of any of said resistors remote from said junctions to any tap of said secondary winding, whereby analog currents representing a function can be set up at said summing junctions, commutator means having segments connected to said junction and wiper means, measuring means, adapted to measure selectively mean, mean modulus and root mean square values, connected to said wiper means, potentiometer means, having adjustable tapping means, connected across said primary winding, inverter means connected between said adjustable tapping means and said measuring means, means for providing a second series of currents whereby a derivative of said function can be calculated comprising, a further potentiometer, having adjustable tapping means, connected across said primary winding, a series of resistors each of which connects one of said junctions to said tapping means of said further potentiometer, the values of the resistors in each series having their $n^{th}$ differences constant, a mean resistor, having a value equal to the mean value of said resistors in said series, connected between the tapping means of said further potentiometer and said inverter and said values of said resistors in said series have all mean differences from $(n-1)$ to one, equal to zero.

4. An electrical calculating device including an A.C. source, a transformer having a primary winding and a multitap secondary winding, said primary winding being connected to said source, a plurality of groups of resistors, the values of the resistors in said groups being in a geometrical progression, a number of summing junctions equal to the number of said groups of resistors, and one end of each of said resistors in each of said groups being connected to one of said junctions, means for connecting the end of any of said resistors remote from said junctions to any tap of said secondary winding, whereby analog currents representing a function can be set up at said summing junctions, commutator means having segments connected to said junction and wiper means, measuring means, adapted to measure selectively mean, mean modulus and root mean square values, connected to said wiper means, potentiometer means, having adjustable tapping means, connected across said primary winding, inverter means connected between said adjustable tapping means and said measuring means, means for providing a second series of currents whereby a derivative of said function can be calculated comprising, a further potentiometer, having adjustable tapping means, connected across said primary winding, a series of resistors each of which connects one of said junctions to said tapping means of said further potentiometer, the values of the resistors in each series having their $n^{th}$ differences constant, a mean resistor, having a value equal to the mean value of said resistors in said series, connected between the tapping means of said further potentiometer and said inverter, and means for reversing the phase of said second series of currents.

5. An electrical calculating device including:
   an A.C. source,
   a transformer having a primary winding and a multitap secondary winding, said primary winding being connected to said source,
   a plurality of groups of resistors, the values of the resistors in said groups being in a geometrical progression,
   a number of summing junctions equal to the number of said groups of resistors, and one end of each of said resistors in each of said groups being connected to one of said junctions,
   means for connecting the end of any of said resistors remote from said junctions to any tap of said secondary winding, whereby analogue currents representing a function can be set up at said summing junctions,
   commutator means having segments connected to said junction and wiper means,
   measuring means, adapted to measure selectively mean, mean modulus and root mean square values, connected to said wiper means,
   a phase-splitting transformer of adjustable turns ratio having primary and secondary windings, said primary winding being connected to said A.C. source, and inverter means connected between said secondary winding of said phase-splitting transformer and said measuring means.

6. An electrical calculating device according to claim 5 including:
   means for providing a second series of currents whereby a derivative of said function can be calculated comprising,
   a further phase-splitting transformer, having primary and secondary windings, said primary winding being connected to said A.C. source,
   a series of resistors each of which connects one of said junctions to said secondary winding of said further phase-splitting transformer, the values of the resistors in each series having their $n^{th}$ differences constant, and
   a mean resistor having a value equal to the mean value of the resistors in said series, connected between said inverter and said secondary winding of said further phase-splitting transformer.

7. An electrical calculating device according ot claim 6 wherein said values of said resistors in said series have all mean differences from $(n-1)$ to one, equal to zero.

8. An electrical calculating device according to claim 5 wherein the measuring means is sensitive to the phase and magnitude of a current fed to it.

9. An electrical calculating device according to claim 8 including:
   further commutator means, having a number of segments and a wiper connected to said inverter, and
   a number of switches equal to the number of said junctions, each of said switches having a wiper connected to one of said junctions, and three contacts, the first of said contacts being connected to earth, the second of said contacts being connected to one of said segments of said first commutator means, and the third of said contacts being connected to one of said segments of said further commutator means.

10. An electrical calculating device according to claim 9 including:
    a first timing switch for controlling the precise duration of current from said first commutator segments, connected between the wiper of said first commutator and said measuring means.

11. An electrical calculating device according to claim 10 including:
    a second timing switch for controlling the precise duration of current from said second commutator segments, connected between the wiper of said second commutator means and said inverter.

References Cited

UNITED STATES PATENTS

| | | | |
|---|---|---|---|
| 1,648,898 | 11/1927 | Harris | 324—134 X |
| 2,965,300 | 12/1960 | Radley et al. | 235—193 |
| 3,024,995 | 3/1962 | Patterson | 235—193 X |
| 3,205,347 | 9/1965 | Wright | 235—193 X |

MALCOLM A. MORRISON, Primary Examiner

J. F. RUGGIERO, Assistant Examiner

U.S. Cl. X.R.

235—184